Oct. 8, 1929.  W. NOBLE  1,731,215
CRANK SHAFT
Filed March 4, 1927   3 Sheets-Sheet 1

INVENTOR
Warren Noble.
BY
ATTORNEY

Oct. 8, 1929. W. NOBLE 1,731,215
CRANK SHAFT
Filed March 4, 1927  3 Sheets-Sheet 2

INVENTOR
Warren Noble.
BY
ATTORNEY

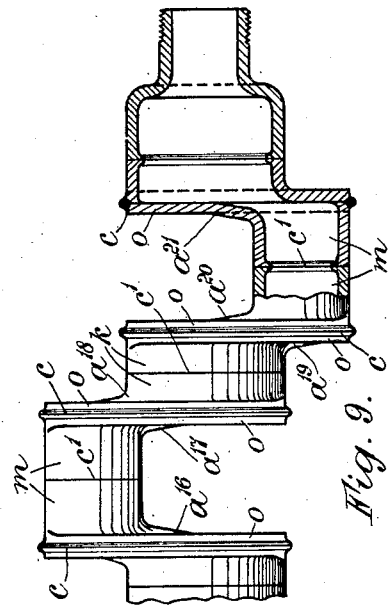
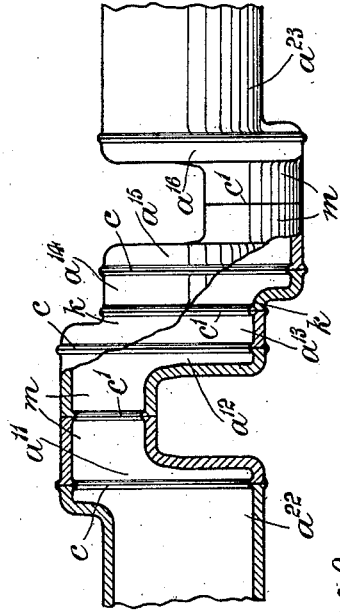
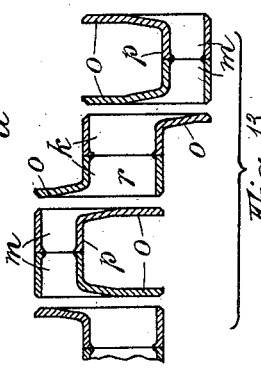
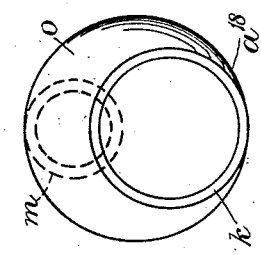
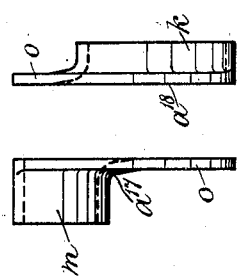

Patented Oct. 8, 1929

1,731,215

UNITED STATES PATENT OFFICE

WARREN NOBLE, OF DETROIT, MICHIGAN

CRANK SHAFT

Application filed March 4, 1927. Serial No. 172,637.

This invention relates to crankshafts and has for its object the simplification of the construction thereof whereby such crankshaft may be effectually made from pressed metal parts, and also provide the standardization of such parts whereby crankshafts of differing types or crank arrangements may be constructed without or with little change in the form of such parts.

This invention also contemplates the provision of a pressed metal element comprising a plate having the general exterior form of one-half of a crank cheek with a tubular shank extending therefrom whereby such element lends itself to utilization in the building up of a crankshaft by welding like members plate to plate and shank to shank, whereby these plates so welded will form the cheeks of the crankshaft and the welded shanks will form the crankpins, or the journals, where such journals are desired in addition to the cheeks, which cheeks, in some constructions, may themselves form the journals of the crankshaft. It is also proposed, where required, to lend thickness to the so constructed cheek by providing the said plates with marginal flanges which will space the plates to the required extent and provide a hollow cheek.

Further objects are to effect the accommodating and concealing of counterbalance weights within the cheeks of the crankshaft, and to obtain a simply constructed hollow crankshaft admitting of internal fluid flow for lubrication or cooling purposes.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a series of similar pressed metal elements characterized by their having the form of crankshaft sections with the parting lines between sections on transverse planes through the cheeks and through the crankpins, the cheek portions of the elements having, where the cheeks are to be of greater thickness than twice that of the pressed metal, marginal walls or flanges to be welded to like flanges of adjacent elements and provide the required over-all thickness or width to the cheeks, and the shank or crankpin portions to be welded to like portions of adjacent elements and form tubular crankpins or similar parts connecting the separate cheeks. These sheet metal elements are welded together in this manner and in such number and arrangement as to make up the desired form of crankshaft, thereby providing an integral hollow crankshaft structure having the welds extending in planes transverse to the crankshaft axis. All of which is more particularly described and ascertained hereinafter, by way of example, having reference to the accompanying drawings, wherein:—

Figure 8 is a further modified arrangement of parts assembled to form a portion of a crankshaft shown partly in section and partly in elevation;

Figure 9 is a view similar to that of Figure 8 of a crankshaft utilizing crank elements with unflanged cheek plates;

Figure 10 is an end elevation of Figure 9;

Figure 11 is an elevation of two adjacent elements of the construction shown in Figure 9 and as they appear before being welded together; and Figure 12 is a view similar to that of Figure 4 illustrating a different form of weld.

Figure 13 is a longitudinal sectional view through a plurality of elements in partially assembled relation.

Similar characters of reference indicate similar parts in the several figures of the drawings.

Figure 1:
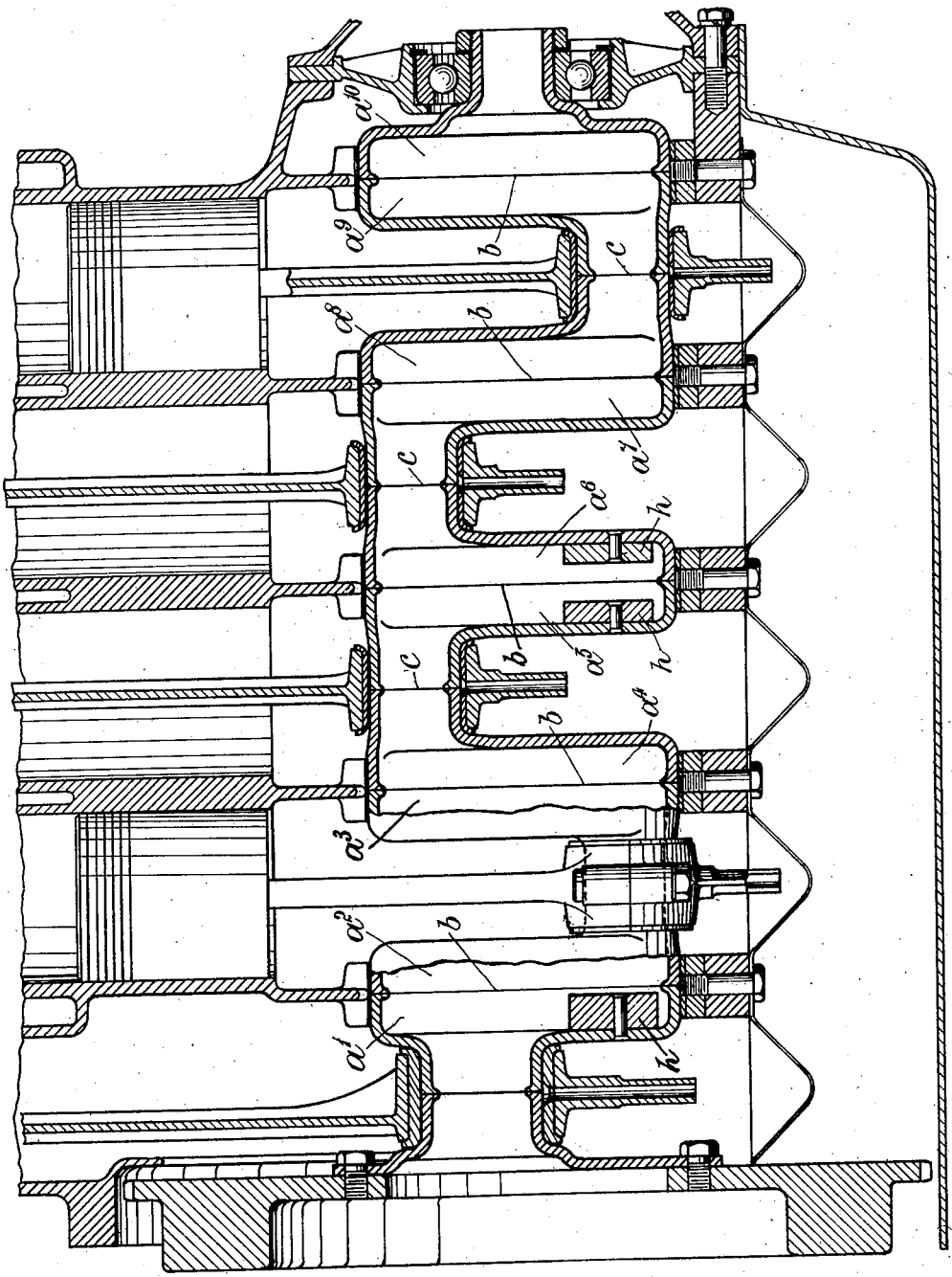
Figure 1 is a longitudinal vertical section through the lower end portion of an engine, showing a crankshaft illustrative of an embodiment of the invention mounted therein with said shaft, partly in section, and partly in elevation.

The crankshaft shown in Figure 1 is indicated as comprising a series of elements $a^1$, $a^2$, $a^3$, $a^4$, $a^5$, $a^6$, $a^7$, $a^8$, $a^9$ and $a^{10}$, welded together along the lines $b$ and $c$ to form an integral structure, the elements $a^2$, $a^3$, $a^4$, $a^5$, $a^6$, $a^7$, $a^8$ and $a^9$ being identical as to form, as will be apparent from the figure.

These elements are formed by pressing, stamping, forging, or they may be cast, when found desirable, from suitable metal, the nature of the said elements lending themselves, however, particularly well to production by pressing operations.

Figure 2:
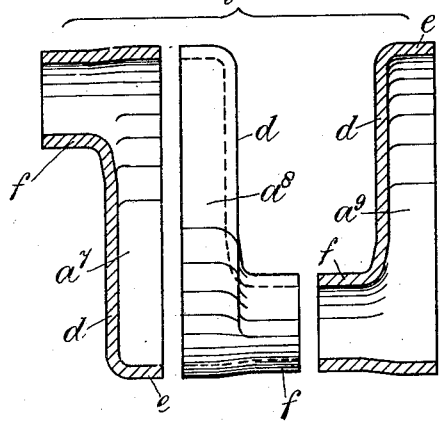
Figure 2 is a detail showing elements partially in section, and partially in elevation entering into the construction of the said crankshaft.
Figure 3:
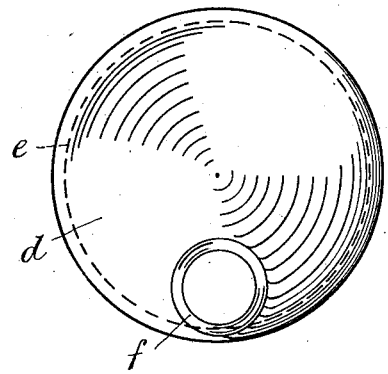
Figure 3 is an end elevation of one of said elements or parts.
Figure 4:
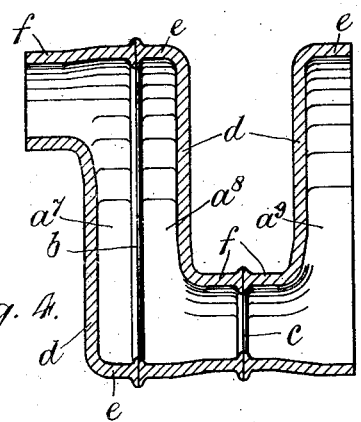
Figure 4 is a sectional view of the parts shown in Figure 3, and as welded together to form a complete cheek and crankpin.
Figure 5:
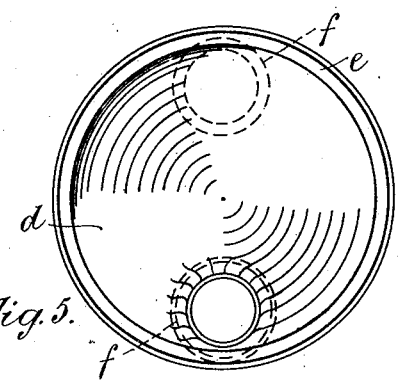
Figure 5 is an end elevation of Figure 4.

The said identical elements as shown in Figures 2 and 4 each comprise a cheek plate $d$ having a marginal flange $e$ extending laterally in one direction therefrom, and a hollow shank extending in the opposite direction, the flange forming part of the peripheral portion of a crank cheek, and the shank, a part of a crankpin of the crankshaft. I have described these members as being identical and will hereinafter refer to these members in the claims as being substantially similar, the word similar meaning identical in conformation, but subject to change to accommodate rights and lefts or bolt holes and other small discrepancies which would not come within the meaning of the strict interpretation of the word identical.

With the edges suitably squared, or otherwise prepared according to welding requirements, the elements are brought together, the end edge of one cheek portion to the end edge of another cheek portion and the end edge of the shank of one part against the end edge of the shank of another part and welded as shown in Figure 4, wherein the parts are indicated as being butt welded at $b$ although other methods may be employed such as the line welding $g$ as shown in Figure 12.

Extraneous metal on the outer surfaces of the crankshaft resulting from the weld may be afterwards removed in any suitable manner as by grinding, leaving the outer surfaces of the crankshaft smooth, as shown in Figure 1.

Figure 6:
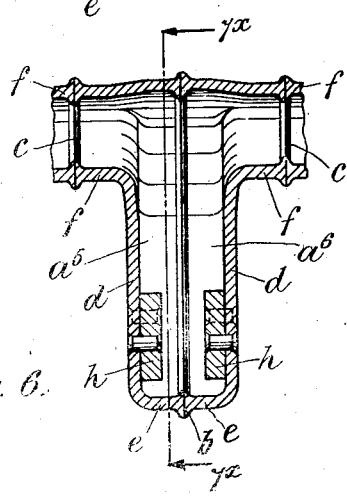
Figure 6 is a sectional view showing a different arrangement of the elements to provide a cheek having crankpins in alignment.

Different arrangements of crankpins may be readily secured by relatively rotating the elements before welding, as in the arrangement shown in detail in Figure 6 wherein the shanks $f$ of the elements $a^5$ and $a^6$ are in alignment instead of offset as in Figure 4.

Figure 7:
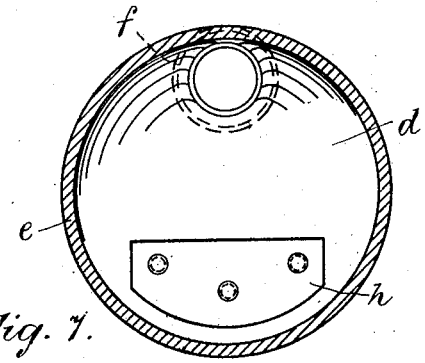
Figure 7 is a section on the line $7^x$—$7^x$ of Figure 6.

Counterbalance weights $h$ are shown in Figures 6 and 7 as housed within the hollow crank cheeks, the construction lending itself to such arrangement.

In Figure 8, two members are shown which are similar to but differ slightly from the members shown in the other figures, the members $a^{11}$, $a^{12}$, $a^{15}$ and $a^{16}$ being alike but having somewhat smaller shanks $m$ than the shanks $k$ of the members $a^{13}$ and $a^{14}$, so that the said larger shanks may serve as journals and the shanks $m$ as crankpins.

The welding is effected on planes transversely intersecting the crankshaft through the cheeks at $c$ and the pins and journals at $c^1$.

Herein, and in the claims, the term "crankpins" may be deemed for the purpose of this application to include journals where the context so admits, as the precise function or use of the hollow shaft in the eventual crankshaft is not contributory to or an essential part of the invention.

The members $a^{16}$, $a^{17}$, $a^{18}$, $a^{19}$, $a^{20}$ and $a^{21}$ of Figure 9 are similar to the members $a^{11}$ to $a^{16}$ of Figure 8 with the difference that the cheek plates $o$ have no marginal flanges and lie directly against one another, a desirable arrangement where minimum thickness in the cheeks is desired or where the welding of flat surfaces together is necessary or more convenient.

Any suitable end members may be provided for the crankshaft, where end bearing conditions do not permit the use of the regular elements therefor, such as $a^1$ and $a^{10}$ of Figure 1 or $a^{22}$ and $a^{23}$ of Figure 8.

It is preferred, in building up the crankshaft, to adopt the method illustrated in Figure 13 wherein the shanks $m$ of the two crankpin elements are welded together to form a crankpin unit $p$ terminating at both ends in the cheek plates $o$, journal units $r$ being also made up of two journal elements the shanks $k$ of which are welded together for that purpose. This affords access to the interior of the shanks for machining or burring operations before the units are eventually welded together cheek plate to cheek plate to complete the crankshaft structure. Machining of the crankpins and journals may be effected before or after the units are welded together as may be most convenient. The meeting portions of the cheek plates are preferably ground before welding to insure proper contact therebetween.

This invention may be developed within the scope of the following claims without departing from the essential features of the said invention, and it is desired that the specifications and drawings be read as being merely illustrative and not in a limiting sense, except as necessitated by the prior art.

What I claim is:—

1. As a new article of manufacture, a crankshaft element having a part to form a crank cheek and a hollow laterally extending shank to form a part of a crankpin whereby said element may be welded cheek to cheek and shank to shank to similar members to build up a crankshaft.

2. As a new article of manufacture, a crankshaft element having a part providing a crank cheek portion, said portion having a marginal flange extending therefrom in one direction, and a tubular portion providing a crankpin portion extending from said cheek portion in a direction opposite to that of said flange, whereby said element may be welded cheek portion to cheek portion and crankpin portion to crankpin portion to similar members to build up a crankshaft, the walls of said cheek portions being spaced apart by said marginal flanges.

3. A crankshaft element according to claim 2 wherein said cheek portion is circular whereby the annular marginal welding flange may form the crankshaft journal.

4. A hollow pressed metal crankshaft, comprising a plurality of elements having faces abutting in a single plane welded together at said faces on planes extending transversely of the shaft and through the crankpins and cheeks of said crankshaft.

5. A hollow pressed metal crankshaft, comprising a plurality of elements assembled in the direction of the length of the crankshaft in abutting relation and welded together on single planes extending transversely of the crankshaft and through the crankpins, cheeks and journals of the crankshaft.

6. A hollow pressed metal crankshaft of the type described having hollow segmental cheeks joined in a transverse plane, and counterbalance weights secured in the interior of said cheeks.

7. A built up crankshaft comprising crankshaft elements terminating in single planes intersecting the cheeks thereof and in single planes intersecting the crank pin intermediate said cheeks, said elements having their terminal portions welded together to provide an integral crankshaft structure.

8. A hollow pressed metal crankshaft comprising a plurality of substantially similar hollow elements, and means for securing said elements in fixed relation with each other, said means comprising welded portions, said portions lying in single planes extending transversely of the crankpins and cheeks of said crankshaft.

9. A hollow pressed metal crankshaft comprising a plurality of hollow elements, and means for securing said elements in fixed relation with each other, said means comprising welded portions, said portions extending around said shaft and lying in planes passed transversely of the shaft through the center of the crankpins, the cheeks and the journals of said crankshaft.

10. In a crankshaft, hollow crankpins and cheeks formed hollow to provide an oil passage therethrough and counterbalance weights in said passage attached to the interior walls of said cheeks.

11. In a hollow crankshaft, a plurality of substantially similar elements, each of said elements, including a cheek portion and a crankpin portion integral with said cheek portion, each of said elements being secured to an adjoining element in a plane transverse to the axis of said crankshaft.

12. In a crankshaft, a crankshaft element comprising a cheek portion and a crankpin portion, a second element comprising a cheek portion and a crankpin portion substantially identical with said first named element, the cheek portion of said first element being secured to the cheek portion of said second named element in abutting relation, whereby a single crankshaft cheek is formed between said crankpin portions.

13. In a hollow crankshaft, a plurality of substantially similar crankshaft elements, each of said elements comprising a cheek portion and a crankpin portion, the cheek portion on each element being secured to a cheek portion of another element, whereby a cheek is formed between each crankpin portion, each crankpin portion of one element being joined to a crankpin portion of another element to form a crankpin between said crankshaft cheeks.

14. In a crankshaft, a crankshaft element comprising a round hollow cheek portion and a hollow crankpin portion, said cheek portion also comprising a portion of a crankshaft journal, a second element also comprising a round hollow cheek portion and a crankpin portion, said second cheek portion also including a journal portion, the cheek portion of said second element abutting the cheek portion of said first element for attachment thereto in a plane transverse to the axis thereof to form a hollow crankshaft cheek and a crankshaft journal between said hollow crankpin portions.

15. In a crankshaft, a plurality of substantially similar crankshaft elements, each of said elements comprising a hollow cheek portion and a hollow crankpin portion, the cheek portion of each element terminating in a face lying in a plane transverse to the axis thereof for attachment to the transverse face of the cheek portion of another element to form a cheek between said crank pin portions, the crankpin portion of each element being secured to the crankpin portion of another element to form a crankpin between the cheek portions, all of said hollow portions including a continuous passage therethrough.

16. In a crankshaft, a plurality of crankshaft elements comprising a round cheek portion and a crankpin portion each of said cheek portions providing a journal portion on the exterior rounded surface thereof, each of said cheek portions being secured to similar cheek portions to form a complete journal and a complete crankshaft cheek between crankpin portions each of said crankpin portions being secured to similar crankpin portions to form complete crankpins between said cheeks and journals, and crankshaft end portions rigidly secured to each outer cheek portion, each of said end portions comprising cheek portions abuttingly assembled with an adjacent cheek portion to complete a journal and a reduced portion comprising an auxiliary journal.

17. The combination as set forth in claim 16 together with a further hollow member abuttingly secured to one of said reduced end portions, said further hollow member comprising a journal portion to complete an end crankshaft journal in conjunction with its adjacent journal portion and a flared end for attachment to a flywheel.

In testimony whereof I affix my signature.

WARREN NOBLE.